US011016165B1

(12) United States Patent
Hogg et al.

(10) Patent No.: US 11,016,165 B1
(45) Date of Patent: *May 25, 2021

(54) ACOUSTIC FIELDS AND MICRO-DEVICES

(71) Applicant: CBN Nano Technologies Inc., Ottawa (CA)

(72) Inventors: Tad Hogg, Mountain View, CA (US); Robert A. Freitas, Jr., Pilot Hill, CA (US)

(73) Assignee: CBN Nano Technologies Inc., Ottawa (CA)

( * ) Notice: Subject to any disclaimer, the term of this patent is extended or adjusted under 35 U.S.C. 154(b) by 332 days.

This patent is subject to a terminal disclaimer.

(21) Appl. No.: 16/008,344

(22) Filed: Jun. 14, 2018

Related U.S. Application Data

(63) Continuation of application No. 14/140,328, filed on Dec. 24, 2013, now Pat. No. 10,024,950, which is a continuation-in-part of application No. 13/656,126, filed on Oct. 19, 2012, now Pat. No. 8,787,115.

(51) Int. Cl.
*G01S 1/00* (2006.01)
*G01S 1/72* (2006.01)
*H04B 11/00* (2006.01)

(52) U.S. Cl.
CPC ............... *G01S 1/72* (2013.01); *H04B 11/00* (2013.01)

(58) Field of Classification Search
USPC .......................................................... 367/137
See application file for complete search history.

(56) References Cited

U.S. PATENT DOCUMENTS

| 7,570,998 B2* | 8/2009 | Zhang | A61B 5/0031 |
| | | | 607/18 |
| 7,945,064 B2* | 5/2011 | O'Brien, Jr. | H04B 13/005 |
| | | | 381/312 |
| 7,985,184 B2 | 7/2011 | Saravazyan | |
| 8,040,020 B2* | 10/2011 | Martin | B81B 7/0058 |
| | | | 310/324 |
| 8,088,067 B2* | 1/2012 | Vortman | A61N 7/02 |
| | | | 382/128 |
| 8,276,211 B1 | 9/2012 | Freitas, Jr. et al. | |
| 8,743,659 B1* | 6/2014 | Hogg | H04B 1/1027 |
| | | | 367/137 |
| 8,743,660 B1* | 6/2014 | Hogg | H04B 1/1027 |
| | | | 367/137 |
| 8,755,252 B1* | 6/2014 | Hogg | H04B 1/1027 |
| | | | 367/140 |
| 8,760,972 B1* | 6/2014 | Hogg | H04B 1/1027 |
| | | | 367/137 |

(Continued)

OTHER PUBLICATIONS

Hogg, T. and Freitas Jr., R; "Acoustic communications for medical nanorobots" (2012), Nano Communications Networks.

(Continued)

*Primary Examiner* — James R Hulka

(57) ABSTRACT

Devices and methods are described for transmitting acoustic waves through a fluid medium to communicate between a macro-scale transceiver and micro-devices or to communicate between micro-devices. Acoustical transmission can be used to communicate data or to provide power to the micro-device(s). The ability to transmit and receive on multiple frequencies can optimize the transmission for a particular situation.

20 Claims, 7 Drawing Sheets

(56) References Cited

U.S. PATENT DOCUMENTS

| | | | | |
|---|---|---|---|---|
| 8,787,115 | B1* | 7/2014 | Hogg | H04B 1/1027 367/137 |
| 8,837,258 | B1* | 9/2014 | Hogg | H04B 1/1027 367/137 |
| 10,024,950 | B1* | 7/2018 | Hogg | G01S 1/72 |
| 2004/0122323 | A1* | 6/2004 | Vortman | A61N 7/02 600/459 |
| 2004/0202339 | A1* | 10/2004 | O'Brien, Jr. | H04B 13/005 381/312 |
| 2007/0281657 | A1* | 12/2007 | Brommer | G06K 19/0723 455/334 |
| 2008/0021289 | A1* | 1/2008 | Zhang | A61B 5/0031 600/300 |
| 2008/0276625 | A1* | 11/2008 | Bretagne | F02G 1/0435 62/6 |
| 2011/0198970 | A1* | 8/2011 | Martin | B81B 7/0058 310/340 |
| 2011/0273965 | A1* | 11/2011 | Mayer | H04B 11/00 367/137 |
| 2012/0051187 | A1* | 3/2012 | Paulson | H04B 11/00 367/135 |
| 2012/0127833 | A1* | 5/2012 | Ghen | H04B 11/00 367/137 |
| 2012/0172721 | A1* | 7/2012 | Curra | A61B 8/4444 600/439 |

OTHER PUBLICATIONS

Tse, D. and Viswanath, P.; "Capacity of Wireless Channels", Fundamentals of wireless communication, (2005), pp. 166-227, Cambridge, UK; New York, Cambridge University Press.

Freitas Jr., R; Nanomedicine, vol. 1: Basic Capabilities, Chapter 7 (1999) Landes Bioscience.

Elwenspoek, M. et al. (2010), "Self-assembly of (sub-)micron particles into supermaterials", Journal of Micromechnics and Microengineering 20(6): 064001.

Mesariya, S. et al. (2012), "Aquasomes—A Self-Assembled Nanotechnology Ststem", Cheminform 43(30); no.

Wu, J.; (2007), "Shear stress in cells generated by ultrasound", Progress in Physics and Molecular Biology 93(1-3), 363-373.

Hogg, T., "Coordinating microscopic robots in viscous fluids", Auton Agent Muti-Agent Syst. (2007) 14:271-305.

Cavalcanti, A.; Shirinzadeh, B.; Freitas Jr., R.; & Hogg, T.; "Nanorobot architecture for medical target identification", Nanotechnology 19 (2008) 015103.

* cited by examiner

ACOUSTIC FIELDS AND MICRO-DEVICES

CROSS-REFERENCE TO RELATED APPLICATIONS

This application is a continuation of and claims priority to pending U.S. application Ser. No. 14/140,328 filed 24 Dec. 2013, which in turn is a continuation-in-part of U.S. application Ser. No. 13/656,126, filed 19 Oct. 2012, now U.S. Pat. No. 8,787,115, to which priority is also claimed. The present application is related to the following divisional applications of application Ser. No. 13/656,126, all filed on 26 Apr. 2013: Ser. No. 13/871,819 (now abandoned); Ser. No. 13/871,872 (now U.S. Pat. No. 8,760,972); Ser. No. 13/871,883 (now U.S. Pat. No. 8,755,252); Ser. No. 13/871,908 (Now U.S. Pat. No. 8,743,659); Ser. No. 13/871,922 (now abandoned); Ser. No. 13/871,930 (now U.S. Pat. No. 8,473,660); and Ser. No. 13/872,051 (now U.S. Pat. No. 8,837,258). All of these applications and patents are incorporated herein by reference.

FEDERALLY SPONSORED RESEARCH

Not applicable.

SEQUENCE LISTING OR PROGRAM

A code listing comprising less than 300 lines of Mathematica code is incorporated in this specification in the attached Program Printout Appendix commencing on page 35 hereof, and ending on page 43.

FIELD OF INVENTION

The present invention relates to acoustics and, in particular, to devices and methods for communicating, powering, shaping fields and creating fields using one or more macro-devices and one or more micro-devices, or a plurality of micro-devices.

BACKGROUND

Micro-devices, or micro-machines, as discussed herein, are devices, often mechanical, electrical, or both, in nature, less than 200 microns in size. Structures and devices of this size and smaller can be built in many ways, such as using MEMS (micro-electro mechanical systems) techniques, which often employ lithography to create microscopic structures (and thereby overlap with integrated circuit manufacture techniques), self-assembly, micro-machining, 3D printing, or any other suitable technique. Note that while an entire micro-device may be up to 200 microns in size, its individual parts may be much smaller. For example, the state of the art in integrated circuit lithography allows features of 22 nm or smaller, imprint lithography allows features smaller than 10 nm, self-assembly allows the creation of structures based on individual molecules, and AFM or SFM-based technologies allow the placement individual atoms. The methods of construction of micro-devices are numerous, and known to those skilled in the art, but for example, U.S. Pat. No. 8,276,211 to Freitas Jr. et al., and US Applications 20130184461, 20130178626, and 20130178627 to Freitas Jr. et al. describe atomically-precise techniques by which such devices could be created, out of diamondoid and other materials, and the contents of these documents is hereby incorporated by reference.

Micro-devices have many potential applications. For example, in the medical field implanted micro-devices could provide high-resolution, real-time measures of many properties. Important solutes could be measured (e.g., glucose, sodium, potassium, calcium, bicarbonate, etc.), as could physical properties such as temperature and pressure. Current examples of macro-scale devices directed at performing similar functions include pill-sized cameras to view the digestive tract as well as implanted glucose and bone growth monitors to aid treatment of diabetes and joint replacements, respectively. The development of micro-devices significantly extends the capabilities of such machines. For example, clinical magnetic resonance imaging (MRI) can move micro-devices containing ferromagnetic particles through blood vessels. (ISHIYAMA, K., SENDOH, M., et al.; "Magnetic micromachines for medical applications." J. of Magnetism and Magnetic Materials (2002) 242-245: 41-46; MARTEL, S., MATHIEU, J.-B., et al; "Automatic navigation of an untethered device in the artery of a living animal using a conventional clinical magnetic resonance imaging system." Applied Physics Letters (2007) 90; OLAMAEI, N., CHERIET, F., et al.; "MRI visualization of a single 15 μm navigable imaging agent and future microrobot." Proc. of the 2010 IEEE Conf. on Engineering in Medicine and Biology Society (2010); 4355-4358.)

Other demonstrated micro-devices use flagellar motors to move through fluids, and offer the possibility of minimally invasive microsurgeries in parts of the body beyond the reach of existing catheter technology. (BEHKAM, B. and SITTI, M.; "Bacterial Flagella-Based Propulsion and On/Off Motion Control of Microscale Objects." Applied Physics Letters (2007) 90; FERNANDES, R. and GRACIAS, D.; "Toward a Miniaturized Mechanical Surgeon." Materials Today (2009) 12(10): 14-20.). The uses for such devices are numerous and extend beyond the field of medicine to uses such as basic research and industrial applications. Note that while exemplary uses are described herein, others will be apparent to those skilled in the art. It should be recognized that the value in the present invention resides in the general principles provided for communicating, powering, and shaping and creating acoustic fields using micro-devices of many different types, in many different environments, not just those discussed herein.

Providing power to micro-devices is a challenge. For example, power from batteries would be limited by their small size and power harvested from the environment is limited by available energy sources and the complexity of manufacturing power generating components at small sizes. Other techniques, such as inductive powering and other forms of wireless power transmission pose other problems in light of factors such as the frequencies needed to efficiently couple to micro-devices, attenuation, and for some applications, safety.

Communication poses a challenge for micro-devices. Small overall device size limits antenna size, which makes selection of wavelengths which can be adequately coupled to a micro transceiver problematic. Further, the optimal modes of communication of a micro-device with a macro-scale transceiver may differ from the optimal modes of communication between micro-devices. Communication between micro-devices can address several problems. For example, such communications could enable micro-devices to coordinate their activities, thereby providing a wider range of capabilities than having each micro-device act independently of others. For instance, nearby micro-devices could compare their measurements to improve accuracy by averaging noise, determine gradients or identify anomalous behaviors such as the failure of a device. Such communication could also allow the micro-devices to combine their measurements into compressed summaries, thereby reducing the amount of information necessary to communicate to an external transceiver. And, communication between micro-devices enables data to be sent to the micro-device closest to, or in best communication with, an external transceiver.

The small size of the micro-devices is not the only challenge to providing power and communication. Micro-devices may operate within environments which raise additional challenges. For example, in the body, tissues, including blood, different organ tissues, and bone, may have physical properties that are not well-characterized at the small sizes relevant to micro-devices and such properties can vary over short distances. The tissue properties may affect transceiver and micro-device design and performance due, for example, to its attenuation characteristics.

Acoustics are one approach to coupling power and data transmission to micro-devices. Sound is readily transmitted through many materials and is easily produced by micro-devices. Ultrasound has been used to communicate with conventional, large-scale implants, and micro-devices can use piezoelectric materials, among other techniques, to produce sound. However, the small size of micro-devices makes them inefficient at converting vibration into sound waves at the frequencies commonly used by larger devices. Micro-devices are more efficient at generating higher frequency sounds. However, many environments including water and biological tissue significantly attenuate high-frequency sound. Even air substantially attenuates sound at high enough frequencies. Compensating for inefficiency or attenuation by using increased power may be impractical due to power limitations. And, in biological settings, even if sufficient power were available, increased power could lead to localized tissue damage due to intense power flux at the surface of the micro-device. Overcoming these problems requires creating a sound field adapted for transmission through various environments such as various gases, water or other fluids, blood, tissue, industrial chemicals or waste, or other environments, through suitable choices of operating frequencies and other parameters. Different choices may be required for sending sound from micro-devices to each other, from a micro-device to an external transceiver, and from an external transceiver to the micro-device. Aggregate sound fields, discussed herein in more detail, add to the complexity of these problems.

Acoustics, in the form of ultrasound, has been used for imaging, cleaning and agitation, industrial and biological measurement and testing, the enhancement of drug delivery (see U.S. Pat. No. 7,985,184 to Sarvazyan on Jul. 26, 2011 for "Ultrasound-assisted drug-delivery method and system based on time reversal acoustics") as an adjunct to antibiotic therapy (and other uses related to cell permeability), for welding, for USID (ultrasound identification), and more. Micro-devices capable of generating ultrasound have the potential to provide similar functions, if the attendant problems with small device size can be overcome.

U.S. Pat. No. 7,570,998 to Zhang et al. on Aug. 4, 2009 for "Acoustic communication transducer in implantable medical device header," teaches an implantable medical device containing an ultrasonic transducer. Communication between the device and an implanted sensor occurs using frequencies in the 10-100 kHz range. These frequencies are suitable for conventional devices, but not micro-scale devices.

U.S. Pat. No. 7,945,064 to O'Brien Jr. et al. on May 17, 2011 for "Intrabody communication with ultrasound," teaches the use of acoustics as an alternative to RF transmission. This describes macro-scale ultrasonic transducers using part of body as a communication channel at frequencies between 100 kHz and 10 MHz. This reference does not teach the use of micro-devices, and the frequencies are generally too low to efficiently couple to micro-devices.

U.S. Pat. No. 8,040,020 to Martin et al. on Oct. 18, 2011 for "Encapsulated active transducer and method of fabricating the same" teaches MEMS-based ultrasound generators. Specific applications (e.g., communication within tissue) are not discussed.

U.S. Pat. No. 8,088,067 to Vortman et al. on Jan. 3, 2012 for "Tissue aberration corrections in ultrasound therapy," teaches adjusting ultrasound for tissue inhomogeneities at larger scales for improved focus. The size scales, and attendant challenges, are different than the present invention.

Theoretical studies of communication with and among sub-millimeter implanted devices, have been published (FREITAS, R., Nanomedicine, Volume I: Basic Capabilities, Chapter 7 (1999) Landes Bioscience.; and HOGG, T. and FREITAS, R.; "Acoustic communication for medical nanorobots." (2012) Nano Communication Networks.), by the inventors and upon which this application is based and which is herein incorporated by reference). However, these studies do not address all of the challenges or details involved in micro-scale communication, power, or aggregation.

While some differences between the invention and the literature are listed above, a more general observation should be made: The literature is not directed to surmounting the practical problems inherent in transmitting, receiving and coordinating sound at small scales and distances in real-world environments such as limitations in available power, sound coupling to micro-devices in general, sound coupling to micro-devices of various sizes, acoustic attenuation in various environments (e.g., air, water, various biological tissues, industrial effluent), efficient acoustic wave generation by micro-devices, noise, communication rates, near field versus far field considerations, safety, choice of frequencies, sound reflection or scattering, and aggregation of sound fields and micro-devices.

SUMMARY

The present apparatuses and methods use acoustics to communicate between one or more macro-scale transceivers and one or more micro-devices, or between multiple micro-devices. The micro-devices may passively scatter or reflect sound from a transceiver, actively generate sound or both. Acoustic waves can also provide power to a micro-device, or may be directed to other purposes such as creating localized heating, shear, or movement. And, micro-devices may act in concert to create or shape sound fields.

Such use of acoustics overcomes many of the disadvantages to the prior art with respect to the powering of micro-devices, communication with micro-devices, and the creation of sound fields at small distances with specific characteristics by teaching the design of devices and acoustic fields capable of providing power, data transfer and other effects, and which are suited to the physical properties and capabilities specific to micro-devices and their environment.

BRIEF DESCRIPTION OF THE DRAWINGS

A complete understanding of the present apparatuses and methods may be obtained by reference to the accompanying drawings, when considered in conjunction with the subsequent, detailed description, in which.

DETAILED DESCRIPTION

Figure 1:
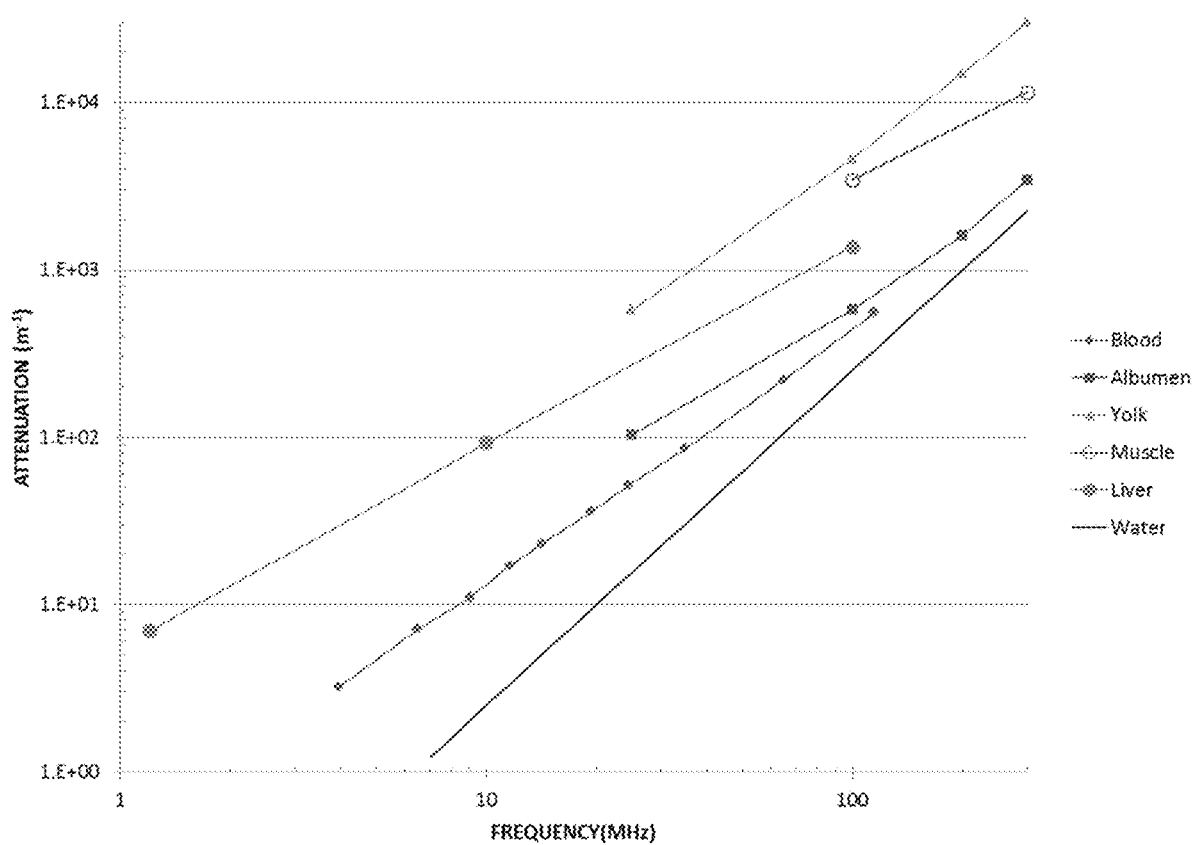
FIG. 1 is a graph illustrating the attenuation coefficients of various materials as a function of frequency.

Before the claimed invention is described in further detail, it is to be understood that the claimed invention is not limited to the particular embodiments described, as such may, of course, vary. It is also to be understood that the terminology used herein is for the purpose of describing particular embodiments only, and not intended to be limiting, since the scope of the present invention will be limited only by the appended claims. Also, it must be noted that as used herein and in the appended claims, the singular forms "a", "an", and "the" include plural referents unless the context clearly dictates otherwise.

Definitions

"Acoustics," "acoustic waves," or "sound" means time-varying pressure waves of any frequency.

"Fluid" includes fluid or gas phase material.

"Micro-device" means any device between 10 nm and 200 microns in size. A micro-device may also be referred to simply as a device where the meaning is clear.

"Reflection" is a type of scattering, but for clarity we may use the term "reflection" when the purpose is to redirect or shape a sound field rather than randomly scatter it.

"Scattering" is the effect caused by acoustic waves reflecting from or passing through regions with different acoustic properties (including micro-devices). Scattering includes lack of scattering or absorption. Scattering includes the near and far field, and resonant and non-resonant scattering.

"Transceiver" includes a device which can transmit and receive, regardless of exact design, and except where context makes it obvious that both transmitting and receiving are required, also includes a transmitter or receiver individually.

Sounds Waves and Power

Acoustics consists of pressure variations in a fluid or solid medium. These variations satisfy the wave equation. We focus on the frequency response by taking the time dependence of acoustic quantities to oscillate with frequency f. The corresponding wavelength is $\lambda=c/f$, where c is the speed of sound. The behavior of sound waves depends on both the amplitude and phase of the waves, which are conveniently represented in combination as complex numbers. Specifically, we take the pressure, p, at location x and time t to be $\Re (Fe^{-i\omega t})$ where $\omega=2\pi f$. Using this choice of time dependence, the wave equation reduces to the Helmholtz equation:

$$\nabla^2 p(x)+k^2 p(x)=0$$

where $\nabla^2$ is the Laplacian differential operator and k is the complex-valued wave vector:

$$k=\omega/c+i\alpha$$

with $\alpha$ characterizing the attenuation of sound waves in the medium. For fluids, the attenuation is related to the dynamic and bulk viscosities, $\eta$ and $\xi$, respectively, by:

$$\alpha=(4\eta/3+\xi)(\omega^2/(2c^3\rho))$$

where $\rho$ is density. The corresponding velocity amplitude at location x is:

$$v(x)=-(i\omega/(c^2k^2\rho))\nabla p(x)$$

The first wave equation above describes how sound propagates in a given media. In the case of sound being generated by a micro-device, for purposes of clarity we do not include in our calculations the internal construction of the micro-device, but instead use boundary conditions specifying the velocity on the micro-device surface. Our modeling assumptions for micro-devices also include that the amplitude of the generated sound approaches zero at large distances and that if only a part of a micro-device surface is actuated to produce oscillations, the remainder of the micro-device surface does not move. These are not fundamental limitations, but rather reasonable simplifications that allow us to more clearly explain the key concepts involved.

A micro-device must apply power to move its surface against the fluid. Due to the small device sizes, we focus on Newtonian viscous effects as the most relevant, rather than non-Newtonian fluids or viscoelastic materials. In a viscous fluid, pressure and viscosity produce forces acting on the device surface. The $i^{th}$ component of the force the fluid exerts on a surface element dA oriented in direction n-hat is $-dA\Sigma_j T_{i,j}$n-hat$_j$ where the stress tensor component $T_{i,j}$ is the flux of the $i^{th}$ component of momentum density across a surface oriented with normal in direction j. For viscous fluids, the stress associated with small amplitude sound waves calculated by the fluid stress equation is:

$$T_{i,j} = p\delta_{i,j} - \eta\left(\frac{\partial v_i}{\partial x_j} + \frac{\partial v_j}{x}\right) - \left(\xi - \frac{2}{3}\eta\right)\delta_{i,j}\nabla \cdot v$$

where $\delta_{i,j}=1$ if i=j and is zero otherwise. The force the micro-device must exert on the fluid to maintain the oscillation at its surface is the negative of the force from the fluid on the device, namely:

$$F=\int_S T\cdot \hat{n}dA$$

where the integral is over the oscillating surface S of the device. When pressure and velocity used to compute the stress in the fluid stress equation above are expressed in terms of the complex-valued amplitudes, the time-dependent force is $\Re (Fe^{-iwt})$ and the power applied by the device on the fluid is:

$$P(t)=\Re (Fe^{-i\omega t})\cdot \Re (ve^{-i\omega t})$$

where v is the velocity amplitude on the surface, assuming the same oscillation everywhere on the surface. This expression gives the time-dependent power for the case of uniform velocity of the device surface. In general, the device could have different oscillation amplitudes, both in magnitude and phase, at different parts of the surface, in which case the power would be the integral of stress times velocity over the surface.

The power requirement can change sign during the oscillation period. That is, for some portion of the oscillation, the device does work on the fluid while at other times the fluid does work on the device. Provided the device structure is elastic rather than dissipative, the device could recover this power for subsequent use. Of more significance for quantifying communication power requirements is the time-averaged power, which in terms of the amplitudes is:

$$P = \frac{1}{2}\Re(F \cdot v^*)$$

where v* is the complex conjugate of v.

The radiated acoustic power arises from the pressure oscillations, with time-averaged power flux across a surface element dAn-hat given by:

$$P_{radiated\,flux} = \frac{1}{2}\Re(pv^* \cdot \hat{n})$$

Integrating this flux over the surface gives the total power radiated through that surface. The previous two equations may be used to compute power dissipation by, and the acoustic radiated power of, the device.

Acoustic Properties of Specific Environments

Transducers have near field and far field regions. Within the near field, non-parallel wave fronts may create areas of constructive and destructive interference, resulting in a complex distribution of flux that can change substantially over short distances. In many applications of acoustics (e.g., medical ultrasound), near field reflections may be considered problematic noise. This is commonly called "near field clutter." However, with respect to the present apparatuses and methods, due to the small sizes and distances that may be involved, near field effects must be accounted for, and in fact can be used to advantage. For example, if one calculates the near field variations proximate to a macroscopic transceiver which is transmitting to one or more micro-devices, it could be possible to position the transceiver so that the micro-devices are in areas of high, or low, acoustic flux, as desired. This has applications including selective communication when multiple micro-devices are present or increased power transmittal to a micro-device. For example, due to device or safety limitations, it could be the case that the average power output from a transducer may not be increased, but regions of higher acoustic power in the near field may allow one to direct that part of the field to specific micro-devices.

The properties of a micro-device's environment substantially affect the choice of acoustic power coupling frequencies and communication frequencies (and the two may not be the same). Herein we consider the acoustic properties of various materials, including biological tissue, which is especially relevant to medical applications.

TABLE 1

| General Environment Assumptions | |
|---|---|
| Parameter | Value |
| speed of sound | c = 1500 m/s |
| density | ρ = 1000 kg/m³ |
| ambient temperature | $T_{body}$ = 310 K |
| thermal conductivity | $k_{thermal}$ = 0.6 W/m/K |
| heat capacity | $c_{thermal}$ = 4200 J/kg/K |

Different materials vary in acoustic properties, including speed of sound and density. For speed of sound and density we use values corresponding to water at body temperature ($T_{body}$) as an adequate approximation for exemplary purposes. The values in Table 1 make reasonable approximations about environment parameters such as the speed of sound and density, for aqueous solutions. These values are not intended to cover all applications, but rather demonstrate one set of parameters that we can use to perform the necessary calculations. Note that we are specifically considering the environment external to a micro-device with these parameters, not the micro-device itself, which may be composed of a substance with very different parameters, such as silicon, silicon carbide, gallium arsenide, diamondoid, polymers, and many other materials and combinations thereof.

Boundaries between different types of tissue can scatter acoustic waves. However, for distances of less than about 100 microns we consider a single type of tissue to have homogeneous characteristics. It is reasonable to ignore reflections from tissue boundaries at this scale because the amplitude of the reflection depends on the difference in acoustic impedance on either side of the boundary, which is small because impedances for most tissues cluster between 1.4-1.8×10⁶ kg/m²s. Scattering due to tissue inhomogeneities is also small because the wavelengths used are generally much larger than the typical 10-500 nm size of intracellular organelles and other potential scattering foci. In the case of an external transceiver, one can create an approximately homogenous environment using, e.g., impedance matching gel.

Even assuming a constant temperature and density, and assuming a lack of scattering, the attenuation for various materials varies a great deal. Variation occurs both between different materials and within the same material at different wavelengths. FIG. 1 shows the attenuation coefficients of several different environments which could be relevant to micro-device function. Note that FIG. 1 is a log-log plot, and so small differences in the lines actually represent large differences in attenuation. The attenuation values span such a large range that representing them on a linear plot is cumbersome. In addition to the attenuation values varying greatly between materials (some tissues vary by over a factor of 40 with respect to water), attenuation values also vary greatly within the same materials as frequency changes. This leads to unintuitive conclusions about the optimal sound frequencies, as will be discussed herein.

Attenuation distance is defined as $1/\alpha(f)$ where the attenuation function, $\alpha(f)$, is a function that varies between materials and is generally determined empirically. The following data illustrates how the attenuation coefficient affects sound attenuation at various distances and frequencies:

| Frequency | 10 Mhz | 100 Mhz | 300 Mhz |
|---|---|---|---|
| Wavelength | 150 µm | 15 µm | 5 µm |
| | Attenuation Distance | | |
| Water | 400,000 µm | 4,000 µm | 440 µm |
| Liver | 11,000 µm | 720 µm | 200 µm (extrapolated) |

Note that while liver's attenuation coefficient, at all frequencies we consider, is substantially higher than water, and although we use it as an exemplary medium with substantial attenuation, many substances have higher attenuation than liver. For example, at 1 MHz (which we cite because the data is easier to come by in the literature, even though this is generally a low frequency for our purposes), bone, tendon, brain, muscle, breast and other tissues have higher (in some cases much higher) attenuation than liver. While importance of any given difference in attenuation between two environments or frequencies will depend on the exact application, since it may represent a substantial change in range, power requirements, resolution, and other factors, as a rule of thumb we will consider a difference of 25% in attenuation, wavelength, frequency, or related parameters to be important, although certainly in some cases smaller differences may need to be considered for optimum system design and performance.

Micro-Device Geometry, Sound Pressure, and Power

While micro-devices could take a variety of shapes, modeling such devices as a sphere facilitates analysis of the general case. In the following example we assume a pulsating sphere whose radius changes as $a+\alpha\epsilon \cos(\omega t)$ with $\epsilon \ll 1$. Due to the spherical symmetry of this geometry, the acoustic pressure and velocity depend only on the distance from the sphere, and velocity is directed radially. Thus acoustic radiation is the same in all directions and the Helmholtz equation becomes:

$$\frac{d^2 p}{dr^2} + \frac{2}{r}\frac{dp}{dr} + k^2 p = 0$$

The solution matching the motion of the sphere at r=a and decreasing to zero as r goes to infinity is:

$$p(r) = \frac{a^3 c^2 k^2 p \varepsilon}{r(-1 + iak)} e^{-ik(a-r)}$$

The corresponding velocity is:

$$v(r) = -\frac{ia^3 \omega \varepsilon (kr + i)}{r(-1 + iak)} e^{-ik(a-r)}$$

The velocity at the surface of the sphere is $v(a)=-ia\omega\varepsilon$. Thus the time-dependent velocity $\Re(v(a)e^{-i\omega t})=-a\omega\varepsilon \sin \omega t$ corresponds to the motion of the sphere discussed above.

The wave vector k has the positive imaginary part so that the last factor in these expressions:

$$e^{-ik(a-r)} = e^{-a(r-a)} e^{iw(r-a)/c}$$

decreases exponentially as r goes to infinity.

Where discussing communication directly between micro-devices, the attenuation distances will often be large compared to the robot sizes and distances between robots we consider. Consequently, we consider the exponential attenuation factor $e^{-a(r-a)} \approx 1$ for these distances. That is, the attenuation factor is a relatively minor contribution to acoustic power loss. Over these distances, pressure decreases as 1/r. The velocity behavior depends on the frequency. If ka is small (low frequency or a small sphere) then v(r) decreases rapidly, as $1/r^2$ near the sphere, up to distances where $kr \approx 1$, beyond which the velocity decreases more slowly, as 1/r.

At high frequencies or for larger spheres, when ka is comparable or larger than one, the velocity decreases at the slower rate 1/r over this full range of distance. Thus the value pv*, which determines the radiated power, decreases as $1/r^3$ for low frequencies and near the sphere or as $1/r^2$ otherwise (e.g., in the case of the longer distances that may be considered when using a macroscopic transceiver). The relative phases of p and v also affect the time-average radiated power. When ka≪1, (i.e., a small sphere or using low frequencies) radiation of acoustic power is less efficient. In tissue, this effect is compounded by the higher tissue viscosity at low frequencies. All of the foregoing affects should be taken into account when determining the communication or power frequencies most suitable for a given situation.

Efficiency and Frequency

Due to the large differences in the attenuation properties of various materials and the large differences in attenuation within the same material at different frequencies, and the effects of distance and device size, there is no single optimum frequency with respect to efficiency. Optimum frequencies are highly use- and environment-specific, and high frequency parameters cannot be simply inferred from lower frequency information and vice versa.

Using the formulas described herein and commonly known, we consider the broadcast efficiency of three different spheres at a distance of 100 microns. Each sphere is modeled as generating sound by uniformly expanding and contracting, with the periodic change in radii generating time-varying pressure waves. The broadcast efficiency can be thought of as being the product of the acoustic efficiency (that is, the fraction of input power which results in acoustic waves at the sphere surface) and the transmission efficiency (that is, the fraction of acoustic energy produced by the sphere which reaches the target distance).

The spheres have radii of 0.5 um, 5 um, and 50 um, which we use as representative of a wide range of possible micro-devices. We consider each sphere in two different environments: water and liver. We plot the resulting efficiency curves in FIGS. 2 and 3. As will be seen from the figures, it is not sufficient to assume that all environments, even if primarily aqueous (as are most biological tissues), behave like water. For example, as shown, the broadcast efficiency at a given frequency or size in liver can be very different from that in water.

Figure 2:
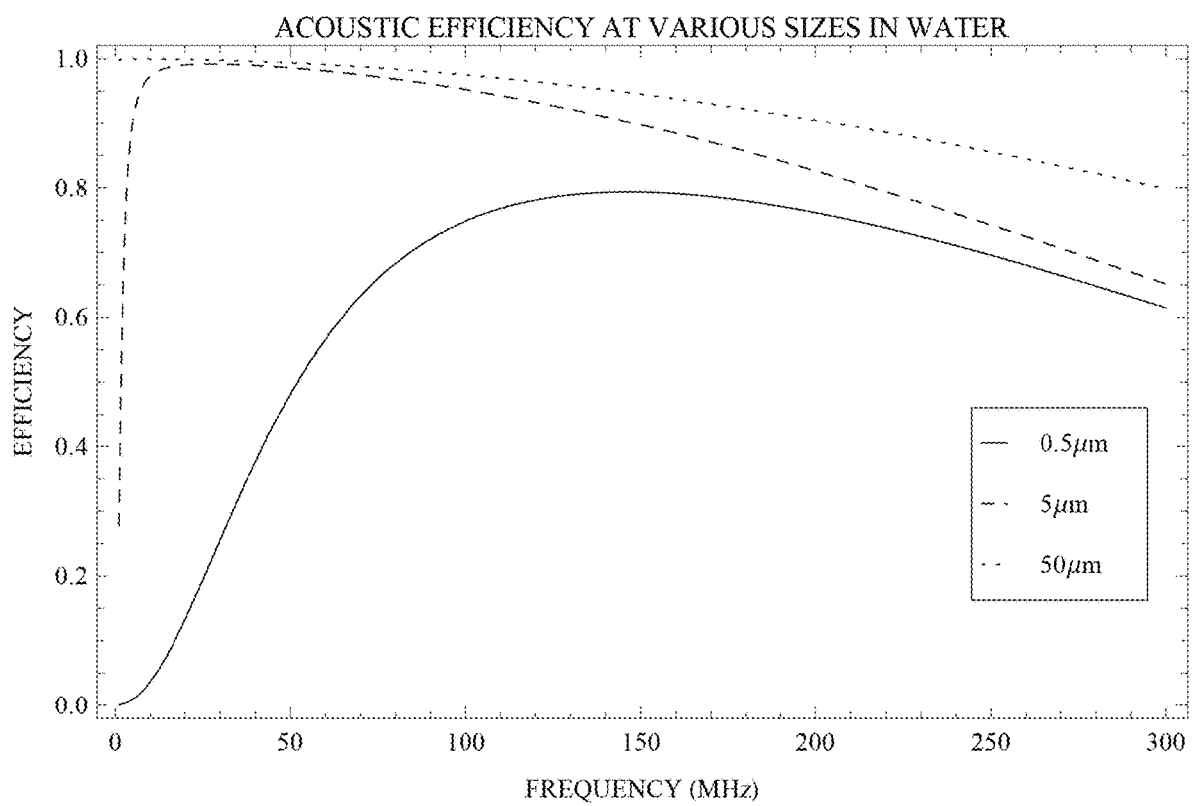
FIG. 2 is a graph illustrating the acoustic efficiency of micro-devices of various sizes in water.
Figure 3:
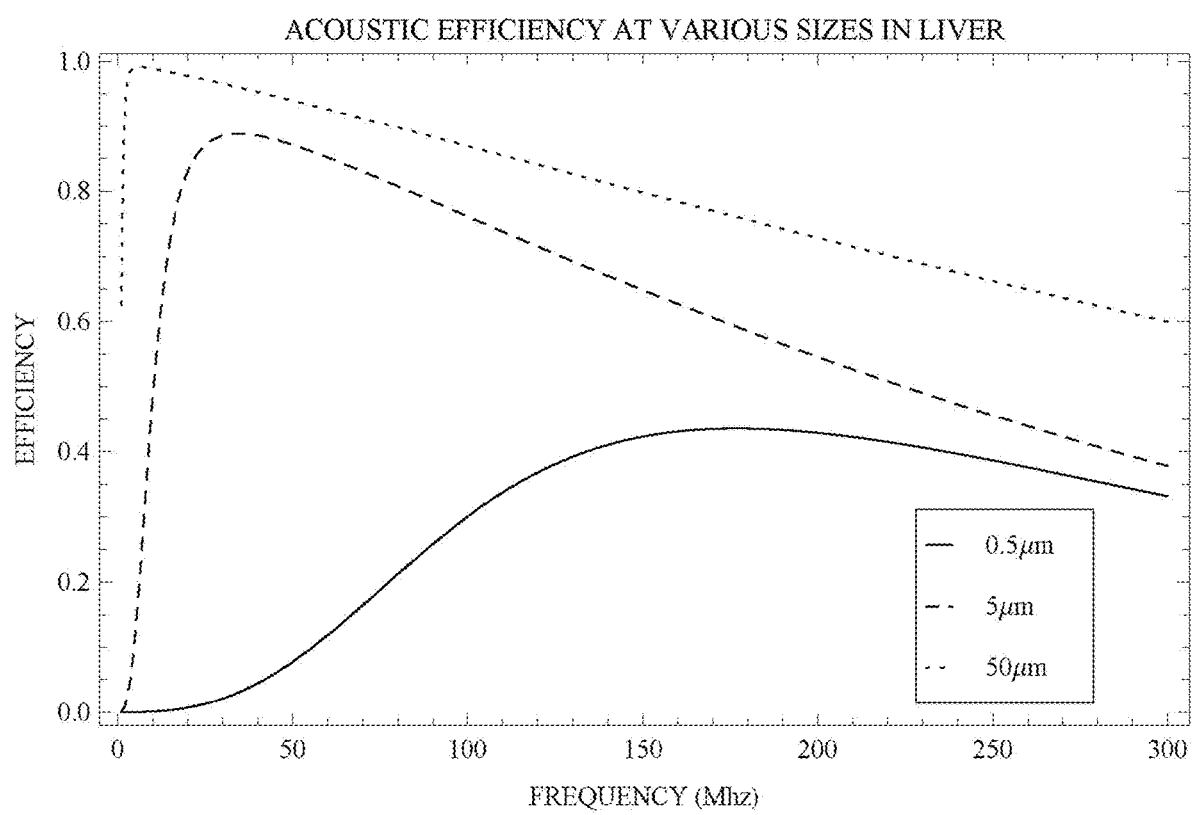
FIG. 3 is a graph illustrating the acoustic efficiency of micro-devices of various sizes in liver.

The three different sphere sizes, the 100 micron broadcast distance and the efficiency curves presented for water and liver are representative cases. It will be obvious to those skilled in the art that other materials, distances, and devices sizes will have their own broadcast efficiency curves which may differ from both water and liver. The data presented in FIGS. 2 and 3 is not intended to provide specific frequency choices for systems using other parameters, but rather to illustrate the principles upon which such choices may be made for any such system. The data is based upon empirically determined attenuation coefficients except that above 100 Mhz the liver data has been extrapolated.

The efficiency functions for the three different size spheres in water, and how to plot the data in Mathematica, is shown by the following code:

(*start code*)
efficiency05water[f_]:=(0.00038*f^2*((4.4*f^2)/10^6+
1))/(E^((5.0*f^2)/10^6)*((1.7*f^4)/10^9+0.00039*f^2+1))
efficiency5water[f_]:=(0.38*f^2)/(E^((4.8*f^2)/10^6)*
(0.39*f^2+1))
efficiency50water[f_]:=(1.0*f^2)/(E^((2.5*f^2)/10^6)*(f^2+
0.0026))

Plot[{efficiency05water[f], efficiency5water[f], efficiency50water[f] }, {f, 1, 300}]
(*end code*)

As can be seen in FIG. 2 and FIG. 3, the maximum broadcast efficiency in water occurs at frequencies of about 1-10 MHz, 25 MHz, and 150 MHz for spheres of 50 um, 5 um, and 0.5 um, respectively. In liver, the maximum broadcast efficiency occurs at about 5 MHz, 30 Mhz, and 180 MHz, for spheres of 50 um, 5 um, and 0.5 um, respectively.

The formulas, methods and data presented herein demonstrate that because acoustic efficiency increases with frequency, but transmission efficiency decreases with frequency, there is a frequency for a given material, sizes and distance, which is the optimal compromise. For example, as FIGS. 2 and 3 show, in some cases the most efficient broadcast frequency is under 30 Mhz, but in other cases, over 100 Mhz.

The differences between the efficiency curves for water and liver, and for the different radii spheres even within the same material make it obvious that the methods described herein to determine efficient frequencies are necessary for optimal design, as no single frequency or simple rule of thumb suffices. In addition to the value in determining the most efficient single frequency for a given system, there is value to knowing the shape of the efficiency curve (that is, the values at frequencies other than the optimal frequency). This is because efficiency is not the only design criteria. Other factors such as equipment limitations, communications requirements or safety limits may suggest that compromises be made in operating at frequencies other than, or in addition to, the most efficient frequencies. In such cases it is helpful to know how far from optimal other frequencies may be when considering the overall frequency choice.

Frequency Choice for Communication

Communication data rates may be important in considering operating frequencies. Since data rate increases with frequency, it may be useful to operate a device at a frequency higher than its optimal broadcast efficiency frequency. This may particularly be the case when the loss of efficiency is small compared to the gain in data transfer rate. For example, a 5 micron micro-device has an efficiency of 0.97 at 30 MHz in a low-attenuation environment. That same micro-device would experience only a small decrease in efficiency at 100 Mhz, where efficiency would be 0.90. Therefore, the micro-device would experience only about a 7% decrease in efficiency, while the increase in frequency increases the possible communication data rate by 333%. Other factors may also affect the choice of communication frequencies, including the use of single versus multiple frequencies ("spread spectrum" or "wideband communication"), the choice of encoding techniques, the level of acceptable error rates, power requirements, distance (including whether the devices are operating in the near or far field) and the presence of ambient noise (including that generated by devices) at a given frequency.

Figure 4:
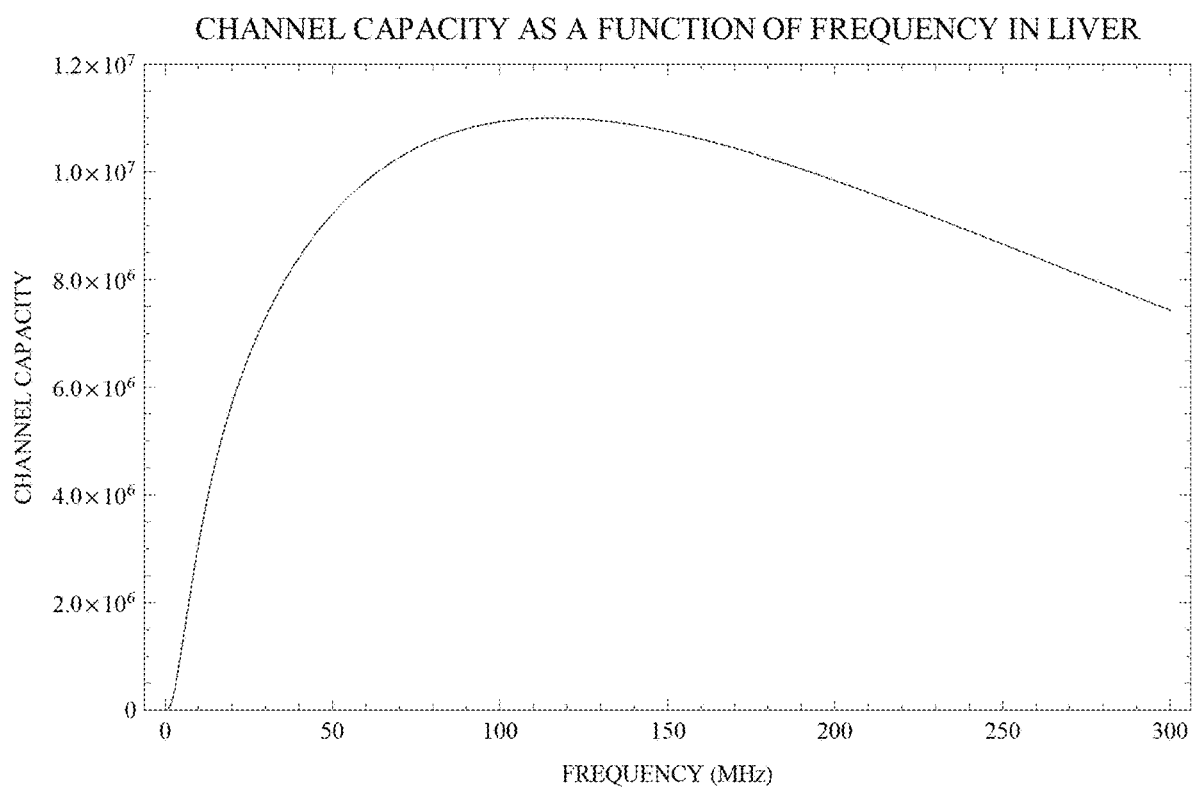
FIG. 4 is a graph illustrating channel capacity as a function of frequency for 5 um devices in liver.

We provide here an example showing channel capacity across frequencies. The data in FIG. 4 assume communication between two micro-devices, each 5 um in diameter, 100 um apart, using a single frequency, with the transmitting device using 100 pW power, in liver tissue, whose efficiency and attenuation characteristics have been described herein. As can be seen from FIG. 4, when all the appropriate constraints are taken into account, an understanding of the choice of optimal frequencies emerges which differs from that which might be inferred by the efficiency characteristics of the environment alone, and certainly differ from that of water, which is used as the basis for similar calculations frequently in the literature.

In this particular case, although a 5 um sphere transmitting acoustic waves in an environment with the attenuation characteristics of liver has maximum broadcast efficiency at about 30 MHz, maximum channel capacity is obtained at about 120 MHz, a 4-fold higher frequency. This is because, in this range, channel capacity increases with frequency faster than efficiency decreases. So, depending on whether power transmission is more important than channel capacity, or vice versa, or whether these (and other) constraints need to be balanced against each other, in this example the appropriate choice of frequency could be 30 MHz, 120 MHz, or somewhere in between.

Note that multiple communication paths may exist. For example, in some cases calculations may dictate that a micro-device should attempt to communicate directly with its end target. In other cases, using an intermediate micro-device, or an external transceiver, as a relay point may prove useful.

Figure 5:
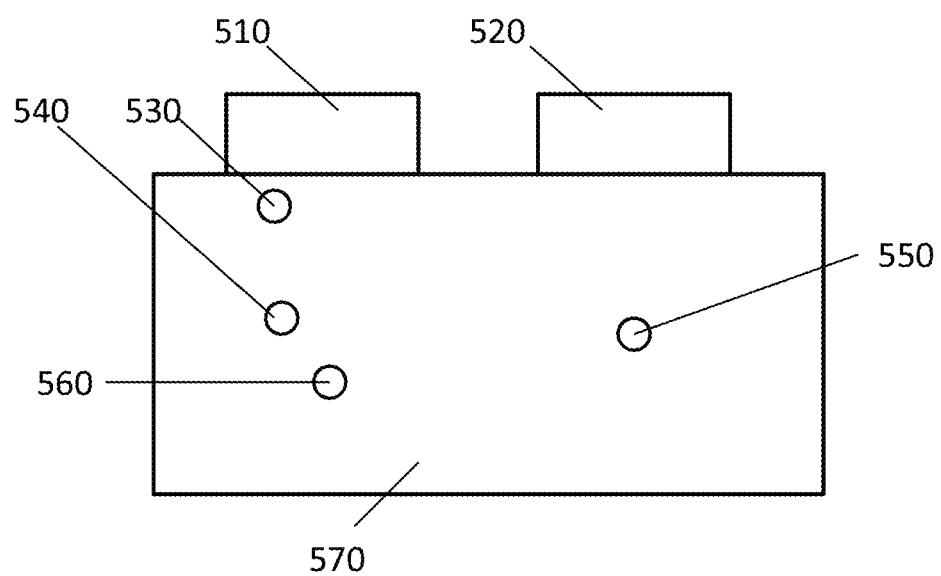
FIG. 5 is a block diagram illustrating possible communication and power arrangements between macroscopic transceivers and microscopic devices.

FIG. 5 illustrates some possible arrangements (not to scale) of macroscopic transducers and micro-devices. A first transducer 510 and second transducer 520 are present, but in reality any number could be used (or one or more transducers could be moved), to communicate with, and provide power to, micro-devices 530, 540, 550 and 560 in a given environment 570. In this particular scenario, micro-device 530 may be in the near field of transducer 510, while micro-devices 540, 550 and 560 may be in the far field of either transducer 510 or 520. Each micro-device may communicate with a transducer directly, or, for example, micro-device 560 could communicate with micro-device 540, which in turn might communicate with transducer 510 directly, or might use micro-device 530 as a relay. Micro-devices may also communicate with each other directly, such as micro-device 560 communicating with micro-device 540 without the involvement of either transducer. Either transducer 510 or 520 could provide power to one or more of the micro-devices, although all other things being equal, the closest transducer would tend to provide the most efficient power source.

Obviously, an accurate understanding of the transmission characteristics of the environment at various distances and frequencies, the power available to each device, the device coupling efficiency and the possible communication pathways, is necessary to make decisions regarding communication and power optimally. As later described herein, we will also see that additional factors must be considered when creating aggregate sound fields.

Wideband Communication

Other exemplary embodiments herein have focused upon single-band transmission of data. These calculations can be adapted to broadband communication in light of the fact that channel capacity with thermal noise can be defined as:

$$\Delta f \log_2\left(1 + \frac{P}{kT\Delta f}\right)$$

which is monotonically increasing in the bandwidth $\Delta f$ when the received power P is independent of frequency. It gets close to its limiting value when $\Delta f \gg P/(kT)$. In our case, the ratio $P/(kT)$ is considerably higher than the operating frequencies considered, suggesting larger bandwidths would perform better than narrowband communication, such as the choice $\Delta f=0.1f$. That is, instead of putting all the input power into a narrow band around the frequency giving the best transmission, wider distribution of frequencies can be better.

However, the received power P is frequency dependent: low frequencies have inefficient conversion of input power into acoustic waves and high frequencies have large attenuation. Thus instead of channel capacity increasing monotonically with increasing bandwidth, there is a limit to the useful bandwidth. For best performance, relatively more power should go in the more efficient frequencies rather than allocating power uniformly over the bandwidth. Additional information relevant to broadband frequency allocation in general (without considering micro-device constraints or environment parameters such as attenuation in various tissues) may be found in Tse, D. and Viswanath, P.; Fundamentals of wireless communication. Cambridge, UK; New York, Cambridge University Press; (2005).

Aggregation of Micro-Devices

As described herein, frequency choice is dictated by multiple factors. For example, attenuation distance varies with frequency, and channel capacity varies with frequency. However, because device size influences the frequencies that can be efficiently transmitted or received by a device, the frequencies that might otherwise be optimal for certain purposes (e.g., power or communication) in a given environment and at a given distance, may be inefficient for a device of a given size. This is a particular problem for micro-devices because the frequencies to which they would most efficiently couple are often highly attenuated by the micro-device's environment.

One way to improve coupling of frequencies which would not couple efficiently to a single micro-device is for multiple micro-devices to aggregate. For example, if two or more micro-devices were linked together, forming a larger "meta-device," the acoustic properties of the meta-device are now dictated, at least in part, not by the size of the individual devices, but the size of the entire meta-device. Note that micro-device linking may be through physical contact, or the devices may only be in acoustic contact (e.g., contributing to an aggregate sound field or using acoustics to communicate).

Using small device aggregation to acoustically mimic larger devices has several benefits over just using larger devices in the first place. For one, smaller devices may be able to reach locations larger devices cannot. And, smaller devices may be able to aggregate into meta-devices of varied size, shape, and capabilities, providing versatility for different uses and operating environments.

Aggregation also offers the ability to more precisely tailor sound fields without a substantial increase in device complexity. Individual devices with only a single, uniformly actuated surface have few options for altering their generation of, or interaction with, a sound field. For example, they can change their phase, they can change their power output, or they can be repositioned. Most other alternatives for altering the reception or creating of sound fields, such as shaping a sound field through differential surface movements, would require an increase in micro-device complexity.

However, since a meta-device is composed of multiple individual devices, each potentially using different frequencies, in different orientations and relative positions, and whose actuation can be controlled over time (both to adjust phase, and for other purposes, for example, in the case where the use of duty cycles is desired), the output of each device can be used to create constructive or destructive interference with other device(s), allowing a sound field to be shaped in ways, and at frequencies which, would be harder or impossible to achieve with a single device. The more precisely a sound field can be shaped, the more accurately one can control the acoustic flux through a given region.

Consider applications where an intense sound field, of a specific frequency, in a precise location, is needed. For example, to create pressure waves intense enough to break up waste or biofilm in a pipe, to remove plaque from an artery, or to kill a cancer cell. Size and power limitations may dictate that no single micro-device can accomplish this by itself. This could be because a single micro-device cannot generate enough power, or cannot efficiently generate the desired frequencies, or could not direct the effects with enough precision to avoid collateral damage. Device aggregation could overcome these limitations.

Aggregation could also benefit communication. Since individual micro-devices may only couple efficiently to a limited range of frequencies, the ability to generate a composite field can be used to shift possible communication frequencies to a range which, for example, has less noise, less attenuation, or is better coupled to other devices in a communication system. Shaping of the sound field via aggregation can also be used to direct acoustic waves towards a receiver, resulting in a more efficient use of power.

Methods of Aggregation

Many different methods could be used to aggregate micro-devices into meta-device. One method of physical aggregation (that is, to create a meta-device where individual devices are in physical, not just sound field, contact) would be to use self-assembly. A substantial body of literature exists on self-assembly at various size scales, including molecular self-assembly, and Meso Scale Self Assembly (MESA), into which micron-scale devices would fall. Shape is often the main basis for self-assembly, but capillary forces, charge, depletion forces, fluid shear, electrostatic effects, hydrodynamic interactions, hydrophobic effects, hydrogen bonding, magnetic fields, Van der Waals forces, and other effects and techniques have been employed as well. Additionally, functionalization of surfaces, such as with DNA, has been used to impart bonding specificity, and carbohydrates have been used to stabilize self-assembled structures containing micro-crystalline diamond for drug delivery. MESARIYA, S., et al. (2012). "Aquasomes—A Self-Assembled Nanotechnology System." ChemInform 43(30). A review of general principles of self-assembly in the sub-micron to micron range can be found in EIWENS-POEK, M., et al. (2010). "Self-assembly of (sub-) micron particles into supermaterials." Journal of Micromechanics and Microengineering 20(6): 064001.).

Yet another method of physical aggregation could involve micro-devices forming mechanical linkages with one another. For example, using clamps, grapples, complementary shapes, or other methods of attachment, micro-devices could dock with each other.

Note that aggregation does not necessarily mean that devices are in physical contact. Rather, multiple individual devices not in physical contact, coordinated to act together, can also form a composite sound field, and therefore falls under what we call an aggregate or meta-device. Sound field-based aggregation requires only proximity, which could be achieved in many ways. For example, proximity could be coincidental (e.g., diffusion brings a group of micro-devices into proximity), pre-planned (e.g., devices are in fixed relative positions), or created through the use of positionable (e.g., via magnetic fields) or mobile micro-devices.

Aggregate Sound Field Creation

Micro-devices may act in concert to create aggregate sound fields, either passively (for example, through scattering or reflection of an external field) or actively, by choosing their relative phases (and in more complex implementations, frequencies, surface actuation motions and other parameters) to create constructive and destructive interference at a target location.

The theory behind the aggregation of acoustic fields is similar to that of a phased array, and while phased arrays are more frequently used for radar or optics, acoustic phased arrays exist and many of the same general principles apply. Traditional phased arrays and related technology come in many types including dynamic phased arrays, fixed phase arrays, active phase arrays, passive phase arrays, synthetic aperture, and inverse synthetic aperture.

Each of these types of arrays may be used with a micro-device aggregate. However, micro-device aggregation is not limited to these configurations, and due to micro-device-specific power, construction, frequency, distance, and environmental issues, the design, deployment and control of aggregated micro-devices can require very different strategies than those used in more traditional phased arrays.

To provide a concrete example, consider a uniformly oscillating sphere with frequency f, and angular frequency $\omega = 2\pi f$. The pressure amplitude at distance r from the center of the sphere (for r larger than the radius of the sphere, i.e., this is the sound field outside the sphere) is $Ae^{Ikr}/r$, where A is proportional to the size of the surface oscillation, $k = \omega/c + i\alpha$, where c is the speed of sound and $\alpha$ is the attenuation (which depends on frequency and environment).

The pressure at a location L from a set of spheres is the sum of this expression for each sphere, with r the distance from the location L to the center of each sphere. The different distances of the spheres to location L mean the sound from each sphere has a different phase change during propagation. The phase change is $e^{I\omega/cr}$.

To have sound from the different spheres combine in-phase at a specific location L, each sphere chooses the phase of its surface oscillation to cancel the phase change from propagation, i.e., chooses the oscillation amplitude A to be a complex number with phase $e^{-I\omega/cr}$.

If the environmental properties (e.g., speed of sound) and geometry (i.e., position of each sphere relative to the target location) are known, even without the spheres moving, these phase factors can be computed and used to deliver the most power to a target region (potentially subject to constraints such as keeping power low in other areas). Of course, as discussed herein, there are other ways of determining desired phase (and other parameters), such as having sensors in or around target and non-target regions that measure the composite sound field, and send messages back to the micro-devices producing the sound.

Phase Choice Giving Constructive Interference at a Target Location

The pressure amplitude at distance r from a sphere is:

$$(a^3 c^2 e^{-i\ k(a-r)} k^2 \in \rho)/((-1+ia\ k)r)$$

Due to attenuation, k has an imaginary part. The oscillation amplitude E can also be complex-valued. The other quantities in this expression are positive real numbers. Hence the pressure amplitude is a positive real number times:

$$(e^{-ik(a-r)} k^2 \in)/(-1+iak) = \in e^{ikr}((e^{-ika} k^2)/(-1+i\ ak))$$

where the factor in parentheses depends on the radius of the sphere a but not the distance to the target location r.

When all spheres are the same size, the factor in parentheses is the same for all sources and hence gives the same phase to the sound waves. Arranging for constructive interference at a target location then requires only that the value $\varepsilon e^{jkr}$ have the same phase for all the sources. For example, picking oscillation amplitude $\varepsilon$ to be a positive real value times $e^{-i\ Re[k]r}$, where r is the distance of that source to the target location, ensures contributes from all sources combine with the same phase, i.e., constructive interference. If the sources differ in size (i.e., differing values of a among the sources), the choice of $\varepsilon$ must also include the contribution from the factor in parentheses, i.e., $(e^{-i\ k\ a} k^2)/(-1+i\ a\ k)$, since otherwise contributions from spheres of different sizes will not necessarily be in phase.

Note that constructive interference at a target location means contributions from multiple sources combine to give greater amplitude than would otherwise be possible. But, this does not necessarily mean the maximum field is at the target: due to decrease in sound with the distance from the sources, some locations closer to the sources than the target could have higher sound intensity than the target, even if those closer locations have some destructive interference due to mismatched phases.

Defining Sound Intensity

Sound intensity can be defined or measured in a variety of ways, including maximal pressure, or pressure change over time. Different definitions may be more appropriate for particular situations. For example, if the desire is to create shear, change in pressure over time may be the most useful definition. Maximal pressure could be useful for other applications, for example sonoluminescence. As FIGS. 6-7 demonstrate, either method can be calculated by the supplied code, and given the teachings herein it would be obvious to those with skill in the art how to use yet other definitions of sound intensity and to optimize a sound field based on those definitions.

The code listed in the Program Printout Appendix, attached hereto and incorporated by reference, can be used as the basis for pressure change calculations, using Wolfram Mathematica (Version 8 or higher).

Figure 6:
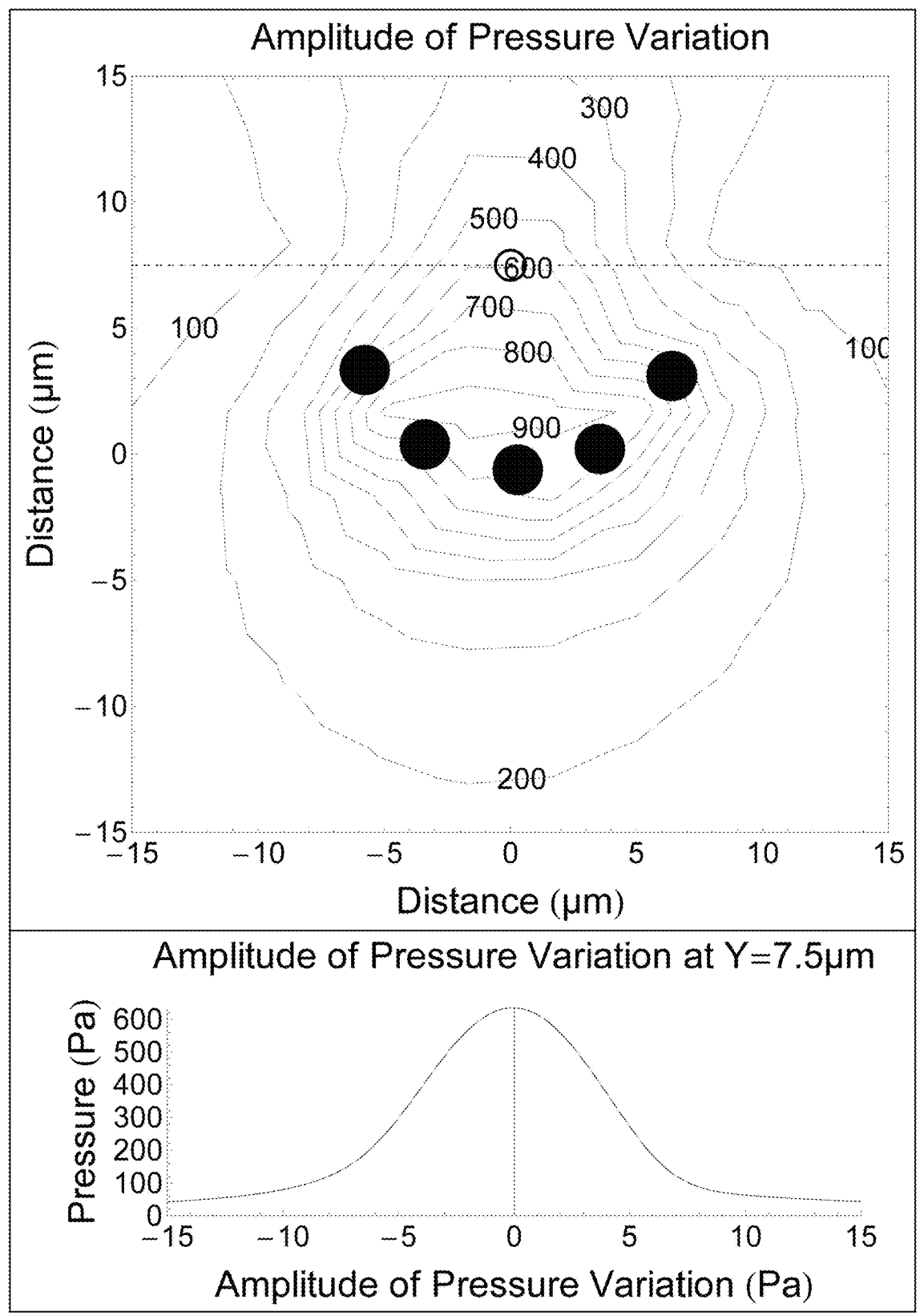
FIG. 6 depicts amplitude changes in pressure in an aggregate sound field created by multiple micro-devices adjusting their relative phases to maximize power at a target location.
Figure 7:
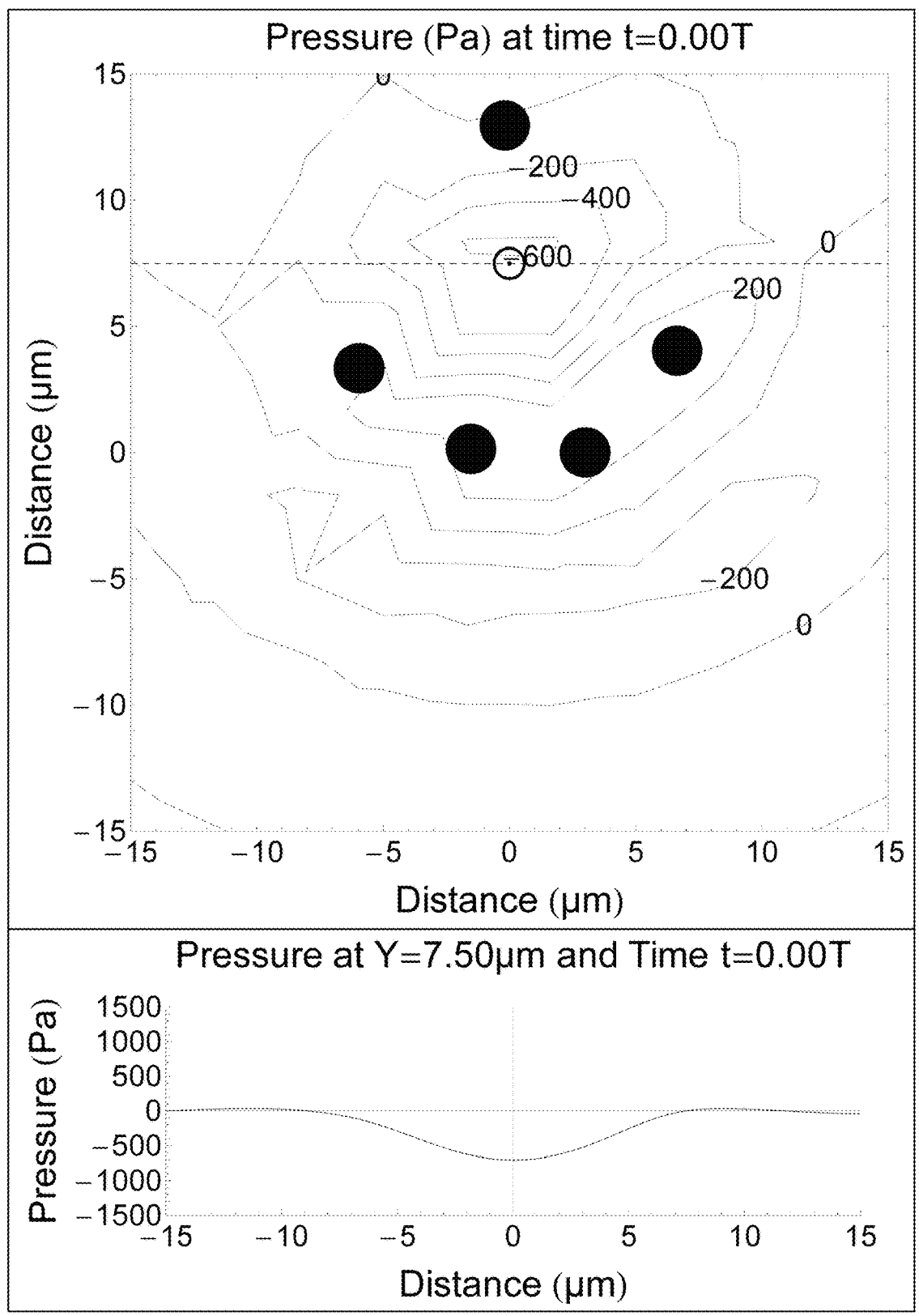
FIG. 7 depicts pressure variations over time in an aggregate sound field created by multiple micro-devices adjusting their relative phases to maximize power at a target location.

FIGS. 6 and 7 depict the outputs of such code, with FIG. 6 showing how multiple sources can adjust their phase to maximize power amplitude at a target location, and FIG. 7 showing how multiple sources can adjust their phase to maximize change in amplitude over time. The examples also illustrate the such configurations can not only maximize power in a given location, but can, at the same time, direct very little power to other locations as can be seen from the slice plots.

Note that due to the diverse applicability of the methods and apparatuses described herein, discussions of sound intensity necessarily require the use of relative terms such as "high intensity" and "low intensity." Different situations could require very different intensity levels to achieve the intended effects, or to avoid undesired effects. For example, the intensity required to kill a cell might be far less than the intensity required to clean industrial waste from a surface, and far more than required for communication. Therefore, we take "high intensity" to mean an intensity capable of causing a particular effect, and "low intensity" to mean an intensity that will not cause a particular effect.

Coordination and Computation

In some circumstances, aggregation can benefit from coordination between members of the meta-device. For example, if the relative phases of the sound fields emanating from each micro-device in a meta-device cannot be controlled, it is difficult to shape a composite sound field as desired. Methods of coordinating individual devices in an array are well-known, having been employed in fields including radar, sonar, and optics, and many of these techniques may be adapted to meta-devices.

However, not all applications of micro-device aggregation require coordination. Take the example of a meta-device used to facilitate efficient coupling at frequencies too low for individual devices. No coordination between micro-devices is required. The meta-device, being larger, naturally couples more efficiently to lower frequencies.

In other applications of meta-devices, a fixed coordination scheme would suffice, for example, like that of a fixed phase array. No computation is required; rather each device could have a fixed phase delay according to its position in the array.

More complex coordination could employ many different strategies. For example, real-time simulation of the sound field would allow calculation of desired aggregate field shapes and how such fields could be generated, based on factors such as the environmental attenuation, and relative micro-device locations, orientations, frequency and power capabilities. And, feedback could be used, with or without sound field simulation, where a method of sensing and reporting aggregate sound field data was available. For example, one or more sensor micro-devices could sit at one or more points in the sound field and provide feedback. The behavior of each micro-device participating in the creation of the aggregate sound field in terms of adjusting its phase, frequency, location, power output, or other factors, could be adjusted in a random or cyclic manner, locking in on a particular set of transmission parameters by listening to reports from the sensor(s), which would be evaluating the change in their local sound field over time and essentially reporting whether the field is evolving in a good or bad direction. While perhaps inefficient in some senses, this scheme has the virtue of requiring very little computation, with the overarching point being that coordination between micro-devices in a meta-device can be made almost arbitrarily simple, or in some cases, non-existent, while still allowing the creation of meta-devices with useful capabilities. Of course, computation could also be offloaded to a macroscopic device, keeping micro-device simplicity lower than otherwise possible.

Sound Field Resolution

Wavelength determines the typical distance over which a sound field can vary significantly. Therefore, desired resolution adds another constraint beyond those such as efficient coupling and environmental attenuation. For example, assume the intended application requires targeting a 15 um area with high sound field intensity, and outside of that 15 um area the field intensity should drop off rapidly to avoid collateral damage. This will generally require wavelengths no longer than about 15 um, or, in an aqueous environment, a frequency of about 100 MHz. Targeting a 5 um area would require the use of frequencies of about 300 MHz. Such frequencies may be heavily attenuated by the environment, and so the desired resolution of the sound field must be balanced against the ability of the devices to couple to the field and for the field to propagate through the environment (or, to require positioning of the micro-devices such that attenuation is of minimal concern).

Therefore, just like determining broadcast efficiency or power coupling, which generally does not result in monotonic solutions and frequently requires tradeoffs, the desire to create aggregate sound fields adds yet another factor: the spatial resolution with which sound field intensity can be controlled. In general, the desire for increased field resolution will require frequency choices which may be higher than those which would result from considering only, e.g., broadcast efficiency.

Reflection

Changes in reflection or scattering could be used as a signal to other devices (micro or macro). For example, high scattering or reflection representing one logical state, and low scattering or reflection indicating another. Of course, analog values could be used as well, and individual micro-devices could act in concert to increase signal strength, or individually to increase communication capacity.

Both scattering and reflection can be controlled by device shape and orientation, as well as device composition, as the impedance change with respect to the surrounding environment will affect absorption versus scattering or reflection. Micro-devices could also actively change their acoustic characteristics to facilitate specific effects. For example, a micro-device could actively actuate its surface to cancel incoming waves, change its shape or orientation, or adjust its impedance through a variety of means, such as changes in size, density, stiffness, or other parameters.

Meta-Materials

Meta-materials are well known in optics, and also exist for sound. Often a meta-material consists of a regular array of sub-wavelength features which interact with fields in ways unattainable via traditional bulk solids. Due to the small features required, meta-materials are often made with techniques similar to those used for MEMS or integrated circuit manufacture (e.g., lithography), resulting in static structures tailored to one set of wavelengths and to produce one effect. Meta-devices and micro-devices may be used to reflect sound in precise ways, creating in effect a meta-material within their environment. This may be an efficient way of redirecting, shaping, or changing other properties of an existing sound field, such as that being supplied by an external transceiver (although not limited to that situation; the technique is also applicable to sound generated by the micro-device). And, since micro-devices can move, and change their acoustic properties, a meta-material based on a meta-device or micro-devices could be more versatile than traditional meta-materials, adapting to couple with different frequencies or produce different effects as needed.

Implementation of Computations

It will be obvious to one skilled in the relevant arts that the calculations described herein can be implemented in various ways, including on a general purpose computer with appropriate software (exemplary code has been provided herein for some such calculations, requiring Mathematica and an Intel-compatible processor, along with the requisite memory, storage, and display hardware), on an application-specific integrated circuit (ASIC), using a field-programmable gate array (FPGA), or using mechanical or analog computing paradigms. The calculations could be done ahead of time and then used to set device frequencies, or to determine device design parameters. Or, the calculations could be performed in real-time by either a computational means attached to a macroscopic transducer or in the micro-device itself. Real-time calculations would have the advantage of being able to use data from the immediate environment (e.g., the attenuation perceived by the transceiver or micro-device) to adjust the calculations accordingly, for example, modifying the frequency or frequencies being used on-the-fly, directing an external field, or changing micro-device acoustic parameters.

Concluding Remarks

Acoustic wave coupling exhibits size, frequency, distance, and device (micro or macro) and environment-dependent phenomena. Traditional macroscopic devices that use acoustic waves may need substantial penetration (for example, medical ultrasound), have a large amount of power available to them, do not have to be designed so as to effectively couple power from or to micro-scale devices, and typically operate in the far field. Micro-devices, on the other hand, may be very close together, may have limited power available, have frequency constraints imposed by their size, may operate in the far or near field, and may be used in unique modes such as scattering, reflection, and aggregate sound field creation. These differences necessitate different design paradigms where, for example, the attenuation coefficient of the environment can have a large impact of the choice of frequencies, efficiency is of great importance for power coupling, wavelength impacts the resolution with which constructive and destructive interference can be employed, other devices may contribute noise to the environment, and determining the optimal data communication rates is multifactorial and so cannot be determined from treatments in the prior art which do not consider all relevant variables. The apparatuses and methods disclosed herein addresses these issues, allowing the practical extension of existing acoustic paradigms to the micro-realm, and enabling new paradigms such as micro-device reflective or scattering-based signaling and sound field shaping.

It should be appreciated that the examples, apparatuses, and methods discussed herein are not intended to limit the possible implementations of the present technology; accordingly, it should be understood that the subject matter defined in the appended claims is not limited to any specific details discussed above.

---

PROGRAM PRINTOUT APPENDIX

```
parameters = {speedOfSound -> 1500 (* meters/second *) ,
      density -> 1000 };
attenuationFit[liver][f_] := 6.1 f^1.18
attenuationFit[yolk][f_] := 1.8 f^1.17
attenuationFit[water][f_] := 0.025 f^2
sphere[pressure[attenuation], {\[Rho]_, a_, \[Epsilon]_, k_,
c_},
      r_] := (a^3 c^2 E^ (-I k (a - r))
      k^2 \[Epsilon] \[Rho])/((-1 + I a k) r)
oscillationScale[a_, f_,
      surfacePressure_] := (surfacePressure Sqrt [c^2 + a^2
\[Omega]^2])/(
      a^2 c \[Rho] \[Omega]^2) /. {\[Omega] -> 2 \[Pi] f,
      c -> speedOfSound, \[Rho] -> density } /. parameters
sphere[velocity[attenuation], {a_, \[Epsilon]_, k_, \[Omega]_},
      r_] := - ((
      I a^3 E^ (-I k (a - r)) (I + k r) \[Epsilon] \[Omega])/((I +
      a k) r^2))
individualPressureField[{\[Rho]_, a_, k_, c_},
      x_?VectorQ, \[Epsilon]_, X_?VectorQ] :=
      Module[{r}, r = Max[a, EuclideanDistance[x, X]];
      sphere[pressure[attenuation], {\[Rho], a, \[Epsilon], k, c},
r]]
combinedPressureField[{\[Rho]_, a_, k_, c_},
      positions : {_?VectorQ ..}, \[Epsilon]_?VectorQ, X_?VectorQ]
:=
      Sum[individualPressureField[{\[Rho], a, k, c},
         positions[[i]], \[Epsilon][[i]], X], {i, Length[positions]}]
/;
      Length[positions] == Length[\[Epsilon]]
scenarioParameters[a_, f_, type_] :=
      N[{\[Rho], a, k, c} /.
         k -> \[Omega]/c + I \[Alpha] /. {\[Rho] -> density,
         c -> speedOfSound, \[Omega] -> 2 \[Pi] f, \[Alpha] ->
         attenuationFit[type][10^-6 f(* MHz *)]} /. parameters]
```

---

PROGRAM PRINTOUT APPENDIX

```
(* Pressure Amplitude *)
With[{micronsToMeters = N[10^-6], MHzToHz = N[10^6], size = 400,
      Xmax = 15, Ymax = 15},
   Manipulate[
      targetPosition = pts[[1]];
      sourcePositions = Rest[pts];
      If[followTarget, Yslice = targetPosition[[2]]];
      params = N[scenarioParameters[a micronsToMeters, f MHzToHz,
tissue]];
      k = params[[3]]; (* wavevector, in 1/meters *)
      \[Epsilon]Scale =
         oscillationScale[a micronsToMeters, f MHzToHz, 1000];
      (* distance from each source to target location:
      converting to standard SI units, i.e., meters,
      to match those used with parameter k *)
      distances =
         micronsToMeters EuclideanDistance[targetPosition, #] & /@
           sourcePositions;
      (* oscillation amplitudes with phase that makes phase at
target \
location equal to zero *)
      \[Epsilon]Values = \[Epsilon]Scale Exp[-I Re[k] distances];
      (* pressure amplitude at target location *)
      targetPressure =
         combinedPressureField[params,
           micronsToMeters sourcePositions, \[Epsilon]Values,
           micronsToMeters targetPosition];
      contourPlot = ContourPlot[
         Abs[combinedPressureField[params,
           micronsToMeters sourcePositions, \[Epsilon]Values,
           micronsToMeters {X, Y}]],
         {X, -Xmax, Xmax}, {Y, -Ymax, Ymax}, Exclusions -> None,
         ContourLabels -> True,
         FrameLabel -> {"distance (\[Micro]m)", "distance
(\[Micro]m)"},
         PlotLabel -> "amplitude of pressure variation (Pa)",
         ContourShading -> If[TrueQ[color], Automatic, None],
         PerformanceGoal -> If[hq, $PerformanceGoal, "Speed"],
         AspectRatio -> Automatic, PlotRange -> Full,
         PlotRangePadding -> None, ImageSize -> size,
         Epilog -> {
           Dynamic[
              If[showSliceLocation, {Dashed,
                 Line[{{-Xmax, Yslice}, {Xmax, Yslice}}]}, { }]],
           MapIndexed[Tooltip[Disk[#1, a],
              Grid[{{StringForm["source ``", #2[[1]]],
                 SpanFromLeft}, {"phase",
                 StringForm["``\[Degree]",
                 Round[Arg[\[Epsilon]Values[[#2[[1]]]]]/
Degree]]}}]] &,
              sourcePositions],
           Thick, Circle[targetPosition, Scaled[.02]],
           Tooltip[Point[targetPosition],
              StringForm["target position: ``", targetPosition]]}];
      slicePlot = Dynamic[Plot[
         Abs[combinedPressureField[params,
           micronsToMeters sourcePositions, \[Epsilon]Values,
           micronsToMeters {X, Yslice}]],
         {X, -Xmax, Xmax}, Exclusions -> None,
         Frame -> {{True, False}, {True, False}},
         FrameLabel -> {"distance (\[Micro]m)", "pressure (Pa)"},
         PlotLabel ->
           StringForm["amplitude of pressure variation at
Y = ``\[Micro]m",
              Yslice],
         AspectRatio -> 0.3, PlotRange -> {0, All},
         PlotRangePadding -> {None, {None, Scaled[0.02]}},
         ImagePadding -> {{40, 5}, {40, 10}}, ImageSize -> size]];
      Column[{contourPlot, slicePlot},
         Frame -> All], {{a, 1, "radius (\[Micro]m)"}, 0.5, 1.5,
         ImageSize -> Tiny},
      {{f, 100, "frequency (MHz)"}, 10, 300,
         ImageSize -> Tiny}, {{tissue, liver}, {water, liver, yolk}},
      Delimiter, Dynamic[Grid[{
         {"pressure at target", SpanFromLeft}, {"magnitude",
           StringForm["``Pa", NumberForm[Abs[targetPressure], 2]]},
         {"phase",
           StringForm["``\[Degree]",
```

PROGRAM PRINTOUT APPENDIX

```
        Round[Arg[targetPressure]/Degree]]}},
            Alignment -> Left]],
    Delimiter, "contour plot", Grid[{
        {Control[{color, {False, True}}],
            Control[{{hq, False, "high quality"}, {True, False}}]},
        {Control[{{showSliceLocation, True, "show slice"}, {True,
            False}}]}, Alignment -> Right],
    Delimiter, "slice plot",
    {{Yslice, 0, "location\nof slice"}, -Ymax, Ymax,
        ControlType -> VerticalSlider, ImageSize -> Tiny,
        Enabled -> Dynamic[Not[followTarget]]},
    {{followTarget, True, "follow target"}, {True, False}}, {{pts,
        Join[{{0, 0.5 Ymax}}, Table[{x, 0}, {x, -6., 6., 3.}]]},
Locator,
        Appearance -> None},
    {targetPosition, None}, {sourcePositions, None},
{targetPressure,
        None}, {params, None}, {k, None}, {distances,
        None}, {\[Epsilon]Scale, None}, {\[Epsilon]Values,
        None}, {contourPlot, None}, {slicePlot, None},
    ControlPlacement -> Left, SaveDefinitions -> True
    ]]
(* Pressure Change Over Time *)
With[{micronsToMeters = N[10^-6], MHzToHz = N[10^6], size = 400,
    Xmax = 15, Ymax = 15, (*
    pressure amplitude at surface of a single sphere, in Pa *)
    Psurface = 1000},
  Manipulate[
    targetPosition = pts[[1]];
    sourcePositions = Rest[pts];
    Prange = 1.5 Psurface;
    If[followTarget, Yslice = targetPosition[[2]]];
    params = N[scenarioParameters[a micronsToMeters, f MHzToHz,
tissue]];
    k = params[[3]]; wavevector, in 1/meters *)
    \[Epsilon]Scale =
        oscillationScale[a micronsToMeters, f MHzToHz, Psurface];
    (* distance from each source to target location:
    converting to standard SI units, i.e., meters,
    to match those used with parameter k *)
    distances =
        micronsToMeters EuclideanDistance[targetPosition, #] & /@
        sourcePositions;
    (* oscillation amplitudes with phase that makes phase at
target \
location equal to zero *)
    \[Epsilon]Values = \[Epsilon]Scale Exp[-I Re[k] distances];
    (* pressure amplitude at target location *)
    targetPressure =
        combinedPressureField[params,
        micronsToMeters sourcePositions, \[Epsilon]Values,
        micronsToMeters targetPosition];
    contourPlot = ContourPlot[
        Re[E^(-I 2 \[Pi] \[Tau])
            combinedPressureField[params,
            micronsToMeters sourcePositions, \[Epsilon]Values,
            micronsToMeters {X, Y}]],
        {X, -Xmax, Xmax}, {Y, -Ymax, Ymax},
        Contours -> Range[-Floor[Prange, 200], Floor[Prange, 200],
200],
        Exclusions -> None, ContourLabels -> True,
        FrameLabel -> {"distance (\[Micro]m)", "distance
(\[Micro]m)"},
        PlotLabel ->
            StringForm["pressure (Pa) at time t ="\[VeryThinSpace]T",
            NumberForm[\[Tau], {2, 2}]],
        ContourShading -> If[TrueQ[color], Automatic, None],
        ColorFunction -> (ColorData["RedGreenSplit"][
            Rescale[#, {-Prange, Prange}]] &),
        ColorFunctionScaling -> None,
        PerformanceGoal -> If[hq, $PerformanceGoal, "Speed"],
        AspectRatio -> Automatic,
        PlotRange -> {-Prange, Prange}, PlotRangePadding -> None,
        ImageSize -> size,
        Epilog -> {
            Dynamic[
            If[showSliceLocation, {Dashed,
                Line[{{-Xmax, Yslice}, {Xmax, Yslice}}]}, { }]],
            MapIndexed[Tooltip[Disk[#1, a],
                Grid[{
                    {StringForm["source`"", #2[[1]]]], SpanFromLeft},
                    {"phase",
                    StringForm["`"\[Degree]",
                        Round[Arg[\[Epsilon]Values[[#2[[1]]]]]/
Degree]]}]] &,
                sourcePositions],
            Thick, Circle[targetPosition, Scaled[.02]],
            Tooltip[Point[targetPosition],
                StringForm["target position:`"", targetPosition]]}];
        slicePlot = Dynamic[Plot[
            Re[E^(-I 2 \[Pi] \[Tau])
                combinedPressureField[params,
                micronsToMeters sourcePositions, \[Epsilon]Values,
                micronsToMeters {X, Yslice}]],
            {X, -Xmax, Xmax}, Exclusions -> None,
            Frame -> {{True, False}, {True, False}},
            FrameLabel -> {"distance (\[Micro]m)", "pressure (Pa)"},
            PlotLabel ->
                StringForm[
                "pressure at Y = `"\[Micro]m and time
    t = `"\[VeryThinSpace]T",
                NumberForm[Yslice, {2, 2}], NumberForm[\[Tau], {2,
2}]]],
            AspectRatio -> 0.3, PlotRange -> Prange,
            PlotRangePadding -> {None, {None, Scaled[0.02]}},
            ImagePadding -> {{50, 5}, {40, 10}}, ImageSize -> size
        ]];
        Column[{contourPlot, slicePlot}, Frame -> All],
        {{a, 1, "radius (\[Micro]m)"}, 0.5, 1.5, ImageSize -> Tiny},
        {{f, 100, "frequency (MHz)"}, 10, 300, ImageSize -> Tiny},
        {{tissue, liver}, {water, liver, yolk}},
        Delimiter, {{\[Tau], 0, "fraction of period"}, 0, 1,
        ImageSize -> Tiny},
        Delimiter, Dynamic[Grid[{
            {"pressure at target", SpanFromLeft}, {"magnitude",
                StringForm["`"Pa", NumberForm[Abs[targetPressure], 2]]},
            {"phase",
                StringForm["`"\[Degree]",
            Round[Arg[targetPressure]/Degree]]}},
            Alignment -> Left]],
        Delimiter, "contour plot", Grid[{
            {Control[{color, {True, False}}],
                Control[{{hq, False, "high quality"}, {True, False}}]},
            {Control[{{showSliceLocation, True, "show slice"}, {True,
                False}}]}, Alignment -> Right],
        Delimiter, "slice plot",
        {{Yslice, 0, "location\nof slice"}, -Ymax, Ymax,
            ControlType -> VerticalSlider, ImageSize -> Tiny,
            Enabled -> Dynamic[Not[followTarget]]},
        {{followTarget, True, "follow target"}, {True, False}}, {{pts,
            Join[{{0, 0.5 Ymax}}, Table[{x, 0}, {x, -6., 6., 3.}]]},
    Locator,
            Appearance -> None},
        {targetPosition, None}, {sourcePositions, None},
    {targetPressure,
            None}, {params, None}, {k, None}, {distances,
            None}, {\[Epsilon]Scale, None}, {\[Epsilon]Values,
            None}, {contourPlot, None}, {slicePlot, None}, {Prange,
    None},
            ControlPlacement -> Left, SaveDefinitions -> True
        ]]
```

What is claimed is:

1. A method for transmitting an acoustic signal through a fluid medium to or from at least one micro-device having an average dimensional size less than 200 microns, the method comprising:

selecting a plurality of frequencies within a range optimized based at least partially on the attenuation properties of the fluid medium; and transmitting the acoustic signal to the at least one micro-device while iteratively changing frequency, each frequency being chosen from said plurality of frequencies;
monitoring the reception of the acoustic signal; and
optimizing the frequency of transmission based on the monitored reception.

2. The method of claim 1 wherein the acoustic signal is transmitted to the at least one micro-device.

3. The method of claim 2 wherein the fluid medium is biological tissue.

4. The method of claim 2 wherein the fluid medium has an attenuation distance at least 25% shorter than that of water for frequencies within said optimized range.

5. The method of claim 2 wherein the acoustic signal communicates data to the at least one micro-device.

6. The method of claim 2 wherein the acoustic signal transmits power to the at least one micro-device.

7. The method of claim 1 wherein the acoustic signal is transmitted from the at least one micro-device to a macro device.

8. The method of claim 1 wherein the step of optimizing the frequency provides a plurality of optimized frequencies for transmission.

9. A system for transmitting an acoustic signal through a fluid medium to or from at least one micro-device having an average dimensional size not more than 200 microns, the system comprising:
   a transmitter capable of transmitting the acoustic signal iteratively on a plurality of frequencies within a range optimized based at least partially on the attenuation properties of the fluid medium;
   a monitor that evaluates the strength of reception of the transmitted signal; and
   an adjustor that causes the transmitter to optimize the frequency of transmission based on the evaluated strength of the acoustic signal.

10. The system of claim 9 wherein the acoustic signal is transmitted to the at least one micro-device.

11. The system of claim 10 wherein the fluid medium is biological tissue.

12. The system of claim 10 wherein the fluid medium has an attenuation distance at least 25% shorter than that of water for frequencies within said optimized range.

13. The system of claim 10 wherein the acoustic signal communicates data to the at least one micro-device.

14. The system of claim 10 wherein the acoustic signal transmits power to the at least one micro-device.

15. The system of claim 9 wherein the acoustic signal is transmitted from the at least one micro-device to a macro device.

16. The system of claim 9 wherein said adjustor causes the transmitter to operate on multiple optimized frequencies.

17. A transmission system for using acoustic frequencies optimized for use with at least one micro-device having an average dimensional size of not more than 200 microns in size, the transmission system comprising:
   a receiver designed to receive acoustic waves which efficiently couple to devices having an average dimensional size of not more than 200 microns in size;
   a transmitter capable of transmitting acoustic waves within a range of frequencies selected to and efficiently couple to devices having an average dimensional size of not more than 200 microns in size; and
   a controller for operating said transmitter to adjust the frequency of the acoustic waves based on the size of the micro-device and the attenuation characteristics of the micro-device environment.

18. The transmission system of claim 17 wherein said controller adjusts the frequency to optimize the acoustic waves for use in communicating with the micro-device.

19. The transmission system of claim 17 wherein said controller operates said transmitter to employ multiple frequencies selected to efficiently couple the acoustic waves to the micro-device.

20. The transmission system of claim 17 wherein said controller operates said transmitter to alter the flux distribution of the near field to efficiently couple sound waves with the micro-device.

* * * * *